United States Patent
Daub et al.

(10) Patent No.: US 11,855,305 B2
(45) Date of Patent: Dec. 26, 2023

(54) METHOD FOR PRODUCING A COVER ASSEMBLY FOR A CELL HOUSING OF A PRISMATIC BATTERY CELL OF A HIGH-VOLTAGE BATTERY IN A MOTOR VEHICLE, BATTERY CELL, AND HIGH-VOLTAGE BATTERY

(71) Applicant: Bayerische Motoren Werke Aktiengesellschaft, Munich (DE)

(72) Inventors: Ruediger Daub, Groebenzell (DE); Niclas Emrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 610 days.

(21) Appl. No.: 16/967,162

(22) PCT Filed: May 15, 2019

(86) PCT No.: PCT/EP2019/062400
§ 371 (c)(1),
(2) Date: Aug. 4, 2020

(87) PCT Pub. No.: WO2019/238341
PCT Pub. Date: Dec. 19, 2019

(65) Prior Publication Data
US 2021/0028416 A1   Jan. 28, 2021

(30) Foreign Application Priority Data
Jun. 11, 2018   (DE) .................... 10 2018 209 270.2

(51) Int. Cl.
*H01M 50/543*   (2021.01)
*H01M 50/169*   (2021.01)

(52) U.S. Cl.
CPC ....... *H01M 50/543* (2021.01); *H01M 50/169* (2021.01); *H01M 2220/20* (2013.01)

(58) Field of Classification Search
CPC ............. H01M 50/543; H01M 50/169; H01M 2220/20; Y02E 60/10
(Continued)

(56) References Cited

U.S. PATENT DOCUMENTS

2004/0091770 A1   5/2004  Kim
2011/0052977 A1   3/2011  Kurata et al.
(Continued)

FOREIGN PATENT DOCUMENTS

CN   1497753 A   5/2004
CN   102270752 A   12/2011
(Continued)

OTHER PUBLICATIONS

International Search Report (PCT/ISA/210) issued in PCT Application No. PCT/EP2019/062400 dated Jul. 9, 2019 with English translation (six pages).
(Continued)

*Primary Examiner* — Christian Roldan
(74) *Attorney, Agent, or Firm* — Crowell & Moring LLP

(57) ABSTRACT

A method produces a cover assembly for a cell housing of a prismatic battery cell of a high-voltage battery in a motor vehicle, by way of an injection molding die, in which a cell terminal and a cover plate, the surface regions of which are provided with a surface structure, are placed and a plastic is injected in such a manner that it bonds to the cell terminal, an upper side of the cover plate facing the cell terminal, and an underside of the cover plate.

12 Claims, 2 Drawing Sheets

(58) Field of Classification Search
USPC .......................................................... 429/163
See application file for complete search history.

(56) References Cited

U.S. PATENT DOCUMENTS

| | | | |
|---|---|---|---|
| 2011/0300414 A1 | 12/2011 | Baek | |
| 2014/0178744 A1* | 6/2014 | Zhu | H01M 50/517 |
| | | | 429/178 |
| 2016/0336554 A1 | 11/2016 | Negishi et al. | |
| 2018/0358605 A1* | 12/2018 | Li | H01M 50/152 |

FOREIGN PATENT DOCUMENTS

| | | |
|---|---|---|
| CN | 105940522 A | 9/2016 |
| DE | 10 2010 027 699 A1 | 4/2011 |
| DE | 10 2010 043 899 A1 | 5/2012 |
| DE | 10 2010 027 699 B4 | 3/2016 |
| DE | 10 2015 208 652 A1 | 11/2016 |
| DE | 10 2017 116 891 A1 | 1/2019 |
| DE | 10 2017 216 886 A1 | 3/2019 |
| EP | 2 393 138 A1 | 12/2011 |
| EP | 3 101 710 A1 | 12/2016 |
| JP | 2008-131005 A | 6/2008 |
| JP | 2015-117771 A | 6/2015 |

OTHER PUBLICATIONS

German-language Written Opinion (PCT/ISA/237) issued in PCT Application No. PCT/EP2019/062400 dated Jul. 9, 2019 (six pages).
German-language Office Action issued in German Application No. 10 2018 209 270.2 dated Feb. 15, 2019 (seven pages).
Chinese-language Office Action issued in Chinese Application No. 201980007514.0 dated Aug. 18, 2022 with English translation (18 pages).
Chinese-language Office Action issued in Chinese Application No. 201980007514.0 dated Mar. 21, 2022 (nine (9) pages).

\* cited by examiner

METHOD FOR PRODUCING A COVER ASSEMBLY FOR A CELL HOUSING OF A PRISMATIC BATTERY CELL OF A HIGH-VOLTAGE BATTERY IN A MOTOR VEHICLE, BATTERY CELL, AND HIGH-VOLTAGE BATTERY

BACKGROUND AND SUMMARY OF THE INVENTION

The invention relates to a method for producing a cover assembly for a cell housing of a prismatic battery cell of a high-voltage battery of a motor vehicle. The invention also relates to a battery cell and to a high-voltage battery.

The emphasis here is in particular on high-voltage batteries or high-voltage accumulators for motor vehicles which can be powered electrically, for example electric vehicles or hybrid vehicles. Such high-voltage batteries have a multiplicity of battery cells which are generally arranged in a cell assembly and are connected to form a battery module. The battery cells can be prismatic battery cells which have a flat-parallelepiped-shaped cell housing in the interior of which a cell winding is arranged. Electrodes of the cell winding are electrically connected to cell terminals of the battery cell which are connected through a cover plate of the cell housing and via which the cell winding can be electrically connected to a connection which is external to the cell, for example a cell terminal of another battery cell. Since the cell housing is generally formed from a metallic material, at least one of the cell terminals must be electrically insulated with respect to the cell housing. For this purpose, DE 10 2015 208 652 A1 discloses arranging an insulating layer made of an electrically non-conductive plastic between two conductive components, that is to say for example between the cell terminal and the cover plate, which insulating layer adheres without adhesive to surface areas of the components by means of mechanical adhesion, and in this way connects them mechanically. The insulating layer is here, for example, a plastic film.

Furthermore, an interior of the housing is to be sealed with respect to an exterior of the housing, in order to prevent an exchange of material between the interior of the housing and the exterior of the housing. The intention is, for example, to prevent electrolyte from the interior of the housing from escaping and to prevent moisture from entering the interior of the housing and as a result speeding up cell aging of the battery cells.

An object of the present invention is to improve a cell housing of a prismatic battery cell for a high-voltage battery of a motor vehicle to the effect that it is embodied in a particularly sealed fashion.

This object is achieved according to the invention by means of a method, a battery cell and a high-voltage battery having the features according to the respective independent patent claims. Advantageous embodiments of the invention are the subject matter of the dependent patent claims, of the description and of the figures.

A method according to the invention serves to produce a cover assembly for a cell housing of a prismatic battery cell of a high-voltage battery of a motor vehicle. In the method, at least one cell terminal is provided with a first terminal area for electrically connecting to a cell winding which is located in an interior of the housing of the cell housing, and a second terminal area for electrically connecting to a connection which is external to the cell, and a cover plate is provided with at least one through-opening for covering the cell housing. Moreover, an injection mold is provided, in which, in the inserted state of the cover plate and of the cell terminal the first terminal area is arranged in the through-opening, an underside of the second terminal area and an upper side of the cover plate overlap in an overlapping area, and a cavity in the form of a fold is formed in the overlapping area between an inner edge of the through-opening and the first terminal element as well as between the underside of the cover plate and the injection mold. Moreover, surface areas of the cover plate and of the cell terminal which, in the inserted state, adjoin the cavity, are predetermined, and a surface structure is generated, at least in certain areas, with structure elements in the predetermined surface areas. Finally, the cover plate and the cell terminals are inserted into the injection mold and a plastic is injected into the cavity, which plastic connects in a positively locking fashion with the structure elements in order to form a seal between the interior of the housing and an exterior of the housing while forming a plastic layer in the form of a fold.

The cover plate, a housing jacket and a base plate form the cell housing for the prismatic battery cell. The cover plate and the bottom (base) plate are embodied, in particular, as rectangular, plate-shaped elements, so that a flat-parallelepiped-shaped cell housing is formed. The cell housing is formed here, in particular, from a metallic material, for example aluminum. The cover plate has, in particular, two through-openings for two cell terminals. The cell terminals are therefore connected through the cover plate. A first cell terminal is electrically connected to an anode of the cell winding, and a second cell terminal is electrically connected to a cathode of the cell winding. In particular, the cell terminal which is electrically connected to the anode is formed at least in certain areas from copper, and the cell terminal which is electrically connected to the cathode is formed at least in certain areas from aluminum.

Each cell terminal is embodied, in particular, in a monolithic fashion and has a T-element-shaped cross section, wherein the second terminal area is embodied in the form of a plate, and wherein the first terminal area is embodied in the form of a web and is arranged on an underside of the second terminal area. In the inserted state of the insertion parts, that is to say of the cell terminal and of the cover plate, in the injection mold the plate-shaped second terminal area is oriented essentially parallel to the upper side of the cover plate, and the first terminal area in the form of a web is oriented essentially perpendicularly with respect to the upper side of the cover plate.

At least one of the cell terminals is now encapsulated by injection molding with a plastic in an injection molding method. In particular, one of the cell terminals, in particular the anode-side cell terminal, is encapsulated by injection molding with an electrically insulating plastic, while the other cell terminal, in particular the cathode-side cell terminal, is encapsulated by injection molding with an electrically conductive plastic. As a result, the anode-side cell terminal is electrically insulated from the cell housing, while the cathode-side cell terminal is at the potential of the cell housing. Through the encapsulation by injection molding with the plastic, the cell terminal is also mechanically attached to the cover plate. In order to additionally provide a particularly high level of tightness between the interior of the housing and the exterior of the housing, the injection mold is produced in such a way that the plastic flows not only into the overlapping area between the underside of the second terminal area and the upper side of the cover plate as well as into the area between the inner edge of the through-opening and the first terminal area, but also covers the underside of the cover plate. In other words, after the injection of the plastic into the injection mold the plastic layer forms not only an L-shaped fold which bends at the through-opening, but is also extended to form a U-shaped fold which adheres at least in certain areas to the underside of the cover plate. The cover plate is therefore coated with the plastic in certain areas on both sides.

In order to improve the adhesion between the plastic and the cell terminal as well as plastic and cover plate, in particular those surface areas of the cell terminal and the cover plate which face the cavity in the injection mold are provided with the surface structure. These surface areas of the cell terminal and the cover plate which are embodied adjacent to the cavity in the inserted state of the insertion parts are predetermined for this purpose. The structure elements are then generated in these surface areas. The structure elements have, in particular, dimensions in the nanometer range or micrometer range and can be embodied, for example, as pores, capillaries, incisions and/or projections. The surface structure is preferably produced at least partially with undercuts. During the injection of the plastic into the cavity via the injection mold, the plastic which is still fluid at this point flows via the structure elements and connects to them, at least in a positively locking fashion, when the plastic socoverifies or hardens. By virtue of the structuring of the respective surface areas of the cell terminal and of the cover plate it is possible, in particular, to dispense with further joining means such as adhesive or the like, since the plastic and the respective surface areas form a particularly stable and effective connection over the entire surface.

By means of the method it is possible to produce a particularly tight connection between the cover plate and the cell terminal by means of the plastic. A particularly tight connection is to be understood as being, in particular, a connection which is at least tight with respect to a helium leak. Therefore, a high-voltage battery with a particularly long service life can be provided for a motor vehicle.

In addition there can be provision that edges of the first terminal area which face the through-opening are embodied in a beveled fashion. The beveling of the first terminal area permits a positive locking connection to be generated in a simple way.

The plastic which is injected into the cavity can be here a thermoplastic or an elastomer or a thermoplastic elastomer. A plastic in the form of a duroplast is preferably injected into the cavity. Duroplasts are plastics which after they have hardened can no longer be deformed by heating or by other measures. Duroplasts are particularly cost-effective and have good temperature-resistance.

According to one embodiment of the invention, at least one of the structure elements is embodied in the surface area adjoining the cavity, of the cover plate as a duct between the upper side and the underside of the cover plate. The at least one structure element is therefore a hole in the cover plate through which, when injection occurs, plastic can flow from one side of the cover plate to the other side of the cover plate, so that the cover plate can be reliably coated with the plastic on both sides.

In one development of the method during the injection process, the injection mold is temperature-controlled with a predetermined temperature profile. In particular, during the injection of the plastic the injection mold is heated so that a temperature of the injection mold exceeds a predetermined first temperature threshold value. The metallic insertion parts are heated by the heating of the injection mold. It is therefore possible for the plastic to spread out particularly well in the cavity and to prevent premature socoverification of the plastic. In the event of a duroplast being used as the plastic, the injection mold is, in particular, only heated. In the event of another plastic, for example a thermoplast or a thermoplastic elastomer being used, there can be provision that the injection mold is cooled after the injection process so that the temperature of the injection mold drops below a predetermined second temperature threshold value. After the plastic in the form of the thermoplast or the thermoplastic elastomer has been distributed sufficiently in the cavity, the injection mold can be cooled so that the plastic can socoverify and can seal the cavity. For this purpose, the injection mold can be arranged in a coolant circuit. The injection molding process therefore constitutes a combination of thermal joining and an injection molding process.

The structure elements of the surface structure are particularly preferably produced by means of a laser. By means of laser technology it is possible to produce surface structures, in particular with undercuts, in a particularly simple way. In particular, the surface structure is produced from an oxide of a respective material of the cover plate and of the cell terminal. For example, the surface structure can be generated quickly and easily by oxidizing the surface of the cover plate and the cell terminal, for example by means of the laser.

It proves advantageous if a sealing ring in the cavity is arranged on the cell terminal, which ring is encapsulated by injection molding when the plastic is injected into the cavity, and blocks a connecting path, formed by means of a boundary faced between the plastic and the cell terminal, between the interior of the housing and the exterior of the housing. The sealing ring is arranged, in particular, on the anode-side cell terminal which comprises copper, in the event of a connection between the plastic and the copper not being sufficiently tight. The sealing ring can be formed, for example, so as to surround the web-shaped terminal area. In particular, a groove for the sealing ring is produced in the first terminal area, and the sealing ring is arranged in the groove. The sealing ring is prestressed by the pressure in the injection molding process. A sealing effect can be increased by the sealing ring, and a possibly leaking point in the boundary layer between the plastic and the cell terminal area can be blocked. It is therefore reliably possible to prevent, for example, moisture from entering the cell housing which is closed off with the cover assembly or electrolyte from exiting the cell housing.

The invention moreover relates to a prismatic battery cell for a high-voltage battery of a motor vehicle with a cell housing having a cover assembly which is produced by a method according to the invention or an advantageous embodiment thereof, wherein the cover assembly is welded to a housing jacket of the cell housing, and the first terminal area is electrically connected to the cell winding via a current collector.

A high-voltage battery according to the invention for a motor vehicle comprises at least one prismatic battery cell according to the invention. The high-voltage battery is, in particular, a traction battery for a motor vehicle which can be powered electrically, for example an electric vehicle or a hybrid vehicle.

The embodiments which are presented with respect to the method according to the invention, and the advantages thereof, apply correspondingly to the battery cell according to the invention and to the high-voltage battery according to the invention.

Further features of the invention emerge from the claims, the figures and the description of the figures. The features and combinations of features which are described above in the description and the features and combinations of features which are specified below in the description of the figures and/or shown solely in the figures can be used not only in the respectively specified combination but also in other combinations or alone.

The invention will now be explained in more detail on the basis of a preferred exemplary embodiment and with reference to the drawings.

BRIEF DESCRIPTION OF THE DRAWINGS

In the figures, identical as well as functionally identical elements are provided with the same reference symbols.

DETAILED DESCRIPTION OF THE DRAWINGS

Figure 1:
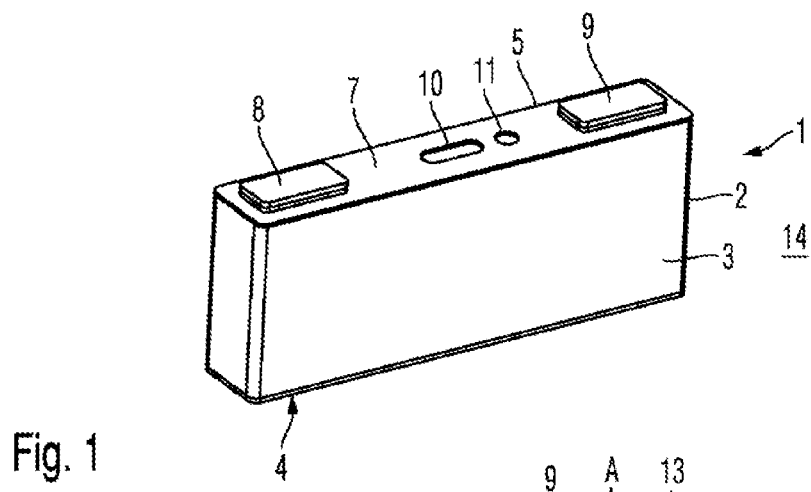
FIG. 1 shows a schematic illustration of an embodiment of a battery cell according to an embodiment of the invention.
Figure 2:
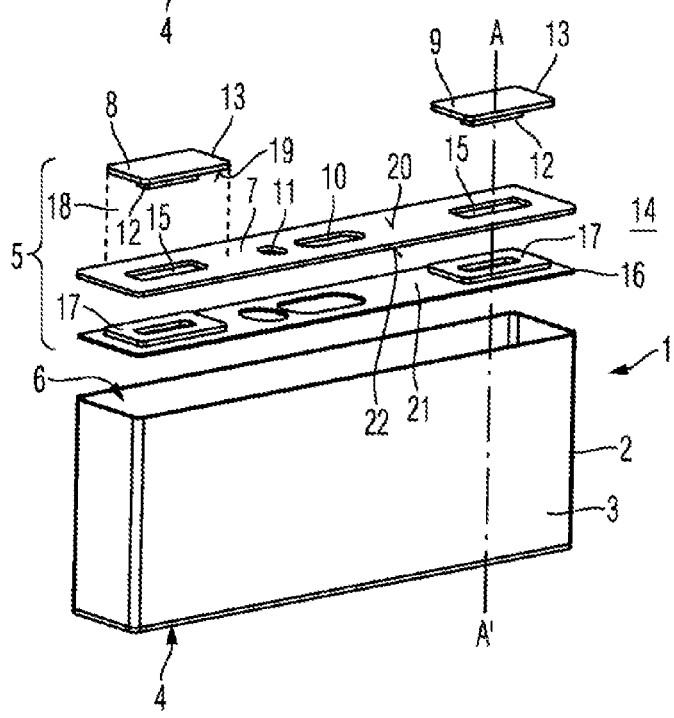
FIG. 2 shows the battery cell according to FIG. 1 in an exploded illustration.
Figure 3:
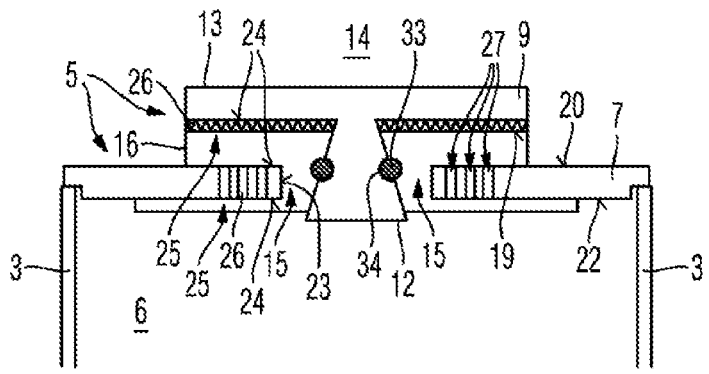
FIG. 3 shows a sectional illustration of the battery cell.

FIG. 1 shows a prismatic battery cell 1 for a high-voltage battery (not shown here) of a motor vehicle which can be powered electrically. FIG. 2 shows the battery cell 1 in an exploded illustration. FIG. 3 shows a section through the battery cell 1 along the sectional line AA'. The battery cell 1 has a cell housing 2 with a housing jacket 3, a base plate 4 and a cover assembly 5. The cell housing 2 is formed from a metallic material, for example aluminum. A cell winding (not shown here) is arranged in an interior 6 of the housing of the cell housing 2.

The cover assembly 5 has a cover plate 7 and two cell terminals 8, 9. The cell terminal 8 is connected, for example, to a cathode of the cell winding in the interior 6 of the housing of the cell housing 2, and the cell terminal 9 is connected, for example, to an anode of the cell winding in the interior 6 of the housing of the cell housing 2. The cover plate 7 also has here a degassing opening 10 for emergency degassing of the battery cell 1 and a filling opening 11 for filling an electrolyte into the interior 6 of the housing during the production of the battery cell 1. The cell terminals 8, 9 have here a first terminal area 12 and a second terminal area 13. The second terminal area 13 is in the form of a plate and is arranged in an exterior 14 of the housing outside the interior 6 of the housing. The first terminal area 12 is embodied in the form of a web and is arranged in the interior 6 of the housing. For this purpose, the first terminal area 12 is led through a through-opening 15 in the cover plate 7. The first terminal area 12 is electrically connected to an electrode of the cell winding, for example via a current collector. The battery cell can be connected to a connection which is external to the cell, for example the cell terminal of another battery cell of the high-voltage battery, via the second terminal area 13, which is electrically connected to the first terminal area 12. The cell terminals 8, 9 can each be embodied in one piece and have a T-element-shaped cross section.

In this context, at least one of the cell terminals 8, 9, for example the anode-side cell terminal 9, is to be electrically insulated from the cover plate 7. Moreover, the cell terminals 8, 9 are to be reliably attached to the cover plate 7. In the closed-off state of the cell housing 2, as shown in FIG. 1, the cell housing 2 is also to be particularly tight. In particular, an exchange of materials between the interior 6 of the housing and the exterior 14 of the housing via leaking points in the through-opening 15 is to be prevented. For this purpose the cell terminals 8, 9 are connected to the cover plate 7 via a plastic layer 16 which is produced by means of an injection molding method. A raised area 17 (illustrated in FIG. 2) of the plastic layer 16 is arranged, in the assembled state of the cover assembly 5, in an overlapping area 18 between an underside 19 of the second terminal area 13 and an upper side 20 of the cover plate 7. The flat area 21 (illustrated in FIG. 2) of the plastic layer 16 is arranged in the assembled state on an underside 22 of the cover plate 7.

In FIG. 3 it is apparent that the plastic layer 16 is embodied in the form of a fold in the region of the cell terminal 9. Plastic is thus located in the overlapping area 18, between an inner edge 23 of the through-opening 15 and the first terminal area 12 as well as on the underside 22 of the cover plate 7. Therefore, the interior 6 of the housing is sealed particularly reliably with respect to the exterior 14 of the housing. The plastic is, in particular, a duroplast. Moreover, the surface areas 24 of the cover plate 7 and of the cell terminal 8, 9 which are to be connected to the plastic have a surface structure 25 with structure elements 26. The structure elements 26, which have been produced, for example, by means of laser structuring, can enter into a positively locking connection with the plastic so that the latter adheres particularly to the surface regions 24 and produces a connection which is, in particular, tight with respect to helium leaks. The structure elements 26 in the cover plate 7 can be embodied, for example, partially as ducts 27. The structure elements 26 can also be pores, undercuts, projections or the like. Here, an edge facing the through-opening 15, of the first terminal area 12, is additionally beveled.

Moreover, as shown in FIG. 3, a sealing ring 33 can be arranged in the first terminal area 12. For this purpose, a groove 34, into which the sealing ring 33 is inserted, can be provided in the first terminal area 12. This sealing ring 33 is then encapsulated by injection molding with the plastic. The sealing ring 33 prevents an exchange of material between the interior 6 of the housing and the exterior 14 of the housing taking place via a boundary layer between the plastic and the cell terminal 9. The sealing ring 33 is arranged, in particular, in the anode-side cell terminal 9 which has copper, since a connection between plastic and copper can be critical with respect to long-term durability.

Figure 4A:
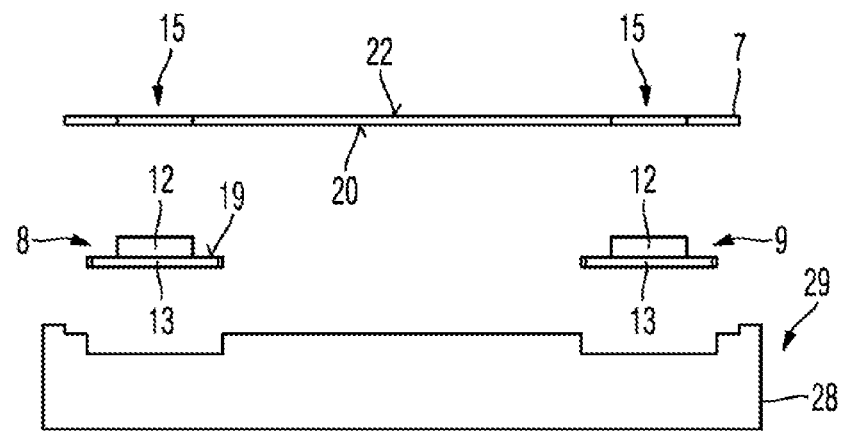
FIGS. 4a to 4c show process steps for a method for producing a cover assembly of the battery cell.
Figure 4B:
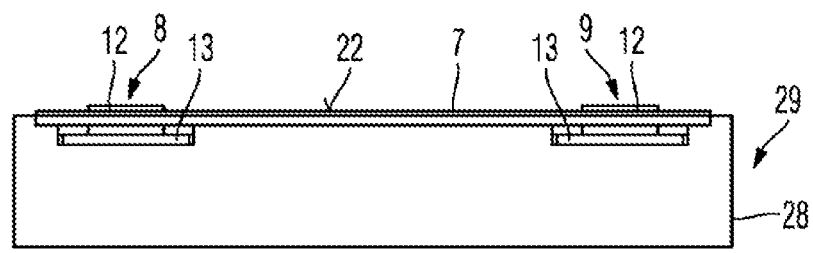
Figure 4C:
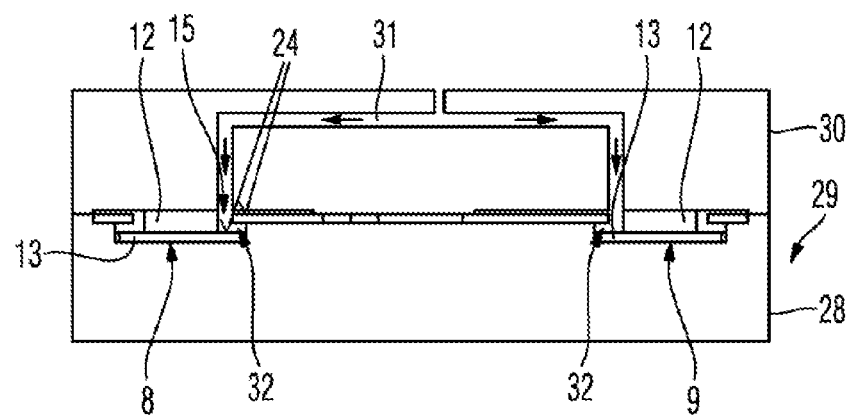

FIGS. 4a, 4b and 4c show process steps for the production of the cover assembly 5. In this context, as shown in FIG. 4a, the cell terminals 8, 9 and the cover plate 7 are inserted into a first molded part 28 of an injection mold 29. The inserted state is shown in FIG. 4b. In FIG. 4c it is shown that a second molded part 30 of the injection mold 29 with ducts 31 is arranged on the first molded part 28 with the cover plate 7 and the cell terminals 8, 9. The injection mold 29 is embodied in such a way that a cavity 32 in the form of a fold is formed, said cavity 32 being formed by an intermediate space between the underside 19 of the second terminal area 13 and the upper side 20 of the cover plate 7, by an intermediate space between the inner edge 23 of the through-opening 15 and the first terminal area 12 and by an intermediate space between the underside 22 of the cover plate 7 and the injection mold 29. The surface areas 24 which adjoin the cavity 32 were provided, at least in certain areas, with the surface structure 25 before the insertion of the cover plate 7 and of the cell terminals 8, 9 into the injection mold 29.

The liquefied plastic is now introduced into the injection mold 29 via the ducts 31, flows into the cavity 32 and there fills the cavity 32 and enters into a positively locking connection with the structure elements 26. During the process steps 4a, 4b, 4c, the injection mold 29 can be temperature-controlled, for example heated, in order to ensure that the cavity 32 is completely filled before the plastic socoverifies. In order to speed up the socoverification of the plastic, the injection mold 29 can be cooled after the injection process.

LIST OF REFERENCE NUMBERS

1 Battery cell
2 Cell housing
3 Housing jacket
4 Bottom (base) plate
5 Cover assembly
6 Interior of the housing
7 Cover plate
8, 9 Cell terminals
10 Degassing opening
11 Filling opening
12 First terminal area
13 Second terminal area
14 Exterior of the housing
15 Through-opening
16 Plastic layer
17 Raised areas
18 Overlapping area
19 Underside of the second terminal area
20 Upper side of the cover plate
21 Flat area
22 Underside of the cover plate
23 Inner edge
24 Surface areas
25 Surface structure
26 Structure elements
27 Ducts
28 First molded part
29 Injection mold
30 Second molded part
31 Duct
32 Cavity
33 Sealing ring
34 Groove

What is claimed is:

1. A method for producing a cover assembly for a cell housing of a prismatic battery cell of a high-voltage battery of a motor vehicle, the method comprising the steps of:
   providing at least one cell terminal with a first terminal area for electrically connecting to a cell winding which is located in an interior of the cell housing, and a second terminal area for electrically connecting to a connection which is external to the prismatic battery cell;
   providing a cover plate, having at least one through-opening, for covering the cell housing;
   providing an injection mold in which, in an inserted state of the cover plate and of the at least one cell terminal:
   (i) the first terminal area is arranged in the at least one through-opening,
   (ii) an underside of the second terminal area and an upper side of the cover plate overlap to define an overlapping area, and
   (iii) a cavity in the form of a fold is formed in the overlapping area, between an inner edge of the at least one through-opening and the first terminal area as well as between an underside of the cover plate and the injection mold;
   predetermining surface areas of the cover plate and of the at least one cell terminal which, in the inserted state, adjoin the cavity;
   generating a surface structure, at least in certain areas, with structure elements in the predetermined surface areas of the cover plate;
   inserting the cover plate and the at least one cell terminal into the injection mold and injecting a plastic into the cavity, which plastic connects in a positively locking manner with the structure elements in order to form a seal between the interior of the cell housing and an exterior of the cell housing.

2. The method according to claim 1, wherein
edges of the first terminal area which face the at least one through-opening are beveled.

3. The method according to claim 1, wherein
a plastic in the form of a duroplast is injected into the cavity.

4. The method according to claim 1, wherein
at least one of the structure elements is embodied, in the predetermined surface areas of the cover plate that adjoin the cavity, as a duct between the upper side and the underside of the cover plate.

5. The method according to claim 1, wherein
during production of the cover assembly, the injection mold is temperature-controlled with a predetermined temperature profile.

6. The method according to claim 5, wherein
during injection of the plastic, the injection mold is heated so that a temperature of the injection mold exceeds a predetermined first temperature threshold value.

7. The method according to claim 1, wherein
the structure elements of the surface structure are produced via a laser.

8. The method according to claim 1, wherein
the surface structure is produced from an oxide of a respective material of the cover plate and of the at least one cell terminal.

9. The method according to claim 1, further comprising:
arranging a sealing ring on the at least one cell terminal within the cavity, which sealing ring is encapsulated by injection molding when the plastic is injected into the cavity, and blocks a connecting path, formed by way of a boundary face between the plastic and the at least one cell terminal, between the interior of the cell housing and the exterior of the cell housing.

10. The method according to claim 9, wherein
a groove for the sealing ring is produced in the first terminal area, and
the sealing ring is arranged in the groove.

11. A prismatic battery cell for a high-voltage battery of a motor vehicle, comprising:
a cell housing having a cover assembly, wherein
the cover assembly is welded to a housing jacket of the cell housing,
the first terminal area is electrically connected to the cell winding via a current collector, and
the cover assembly produced according to the method of claim 1.

12. A high-voltage battery for a motor vehicle, comprising the prismatic battery cell according to claim 11.

* * * * *